(12) United States Patent
Loebig et al.

(10) Patent No.: US 10,371,053 B2
(45) Date of Patent: Aug. 6, 2019

(54) MICROCHANNEL HEAT EXCHANGERS FOR GAS TURBINE INTERCOOLING AND CONDENSING

(71) Applicants: Rolls-Royce Corporation, Indianapolis, IN (US); Rolls-Royce North American Technologies, Inc., Indianapolis, IN (US)

(72) Inventors: James C. Loebig, Greenwood, IN (US); Emil R. Dejulio, Columbus, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 525 days.

(21) Appl. No.: 14/623,707

(22) Filed: Feb. 17, 2015

(65) Prior Publication Data

US 2016/0177829 A1 Jun. 23, 2016

Related U.S. Application Data

(60) Provisional application No. 61/943,064, filed on Feb. 21, 2014.

(51) Int. Cl.
*F02C 7/18* (2006.01)
*F28D 9/00* (2006.01)
(Continued)

(52) U.S. Cl.
CPC ............... *F02C 7/18* (2013.01); *F02C 7/143* (2013.01); *F02K 3/115* (2013.01); *F28D 9/0012* (2013.01);
(Continued)

(58) Field of Classification Search
CPC .... F02C 7/18; F02C 3/04; F02C 7/143; F02C 7/08; F02C 7/10; F02C 7/12; F02C 7/125;
(Continued)

(56) References Cited

U.S. PATENT DOCUMENTS 2,782,009 A * 2/1957 Rippingille ........... F28D 9/0062
165/153
3,818,984 A * 6/1974 Nakamura ............ F28D 9/0018
165/157
(Continued)

FOREIGN PATENT DOCUMENTS

EP 1154135 A2 11/2001
JP 2004028538 A 1/2004

OTHER PUBLICATIONS

European Search Report dated Jun. 26, 2015.
English Abstract of JP 2004025838A.

*Primary Examiner* — Cassey D Bauer
*Assistant Examiner* — Miguel A Diaz
(74) *Attorney, Agent, or Firm* — Fishman Stewart PLLC

(57) ABSTRACT

A gas turbine engine heat exchange system includes a first microchannel heat exchanger (MCHX) configured to transfer heat between a first air stream and a working fluid. The first MCHX includes a plurality of air-passage layers. Each of the air-passage layers includes a plurality of etched air-passage microchannels that are configured to allow passage of the first air stream therethrough. The first MCHX also includes a plurality of working fluid layers. Each working fluid layer includes a plurality of etched working fluid microchannels that are configured to allow passage of the working fluid therethrough.

20 Claims, 5 Drawing Sheets

(51) Int. Cl.
*F28F 3/04* (2006.01)
*F28F 9/02* (2006.01)
*F02M 31/08* (2006.01)
*F02C 7/143* (2006.01)
*F02K 3/115* (2006.01)
*F02C 3/04* (2006.01)
*F28D 21/00* (2006.01)

(52) U.S. Cl.
CPC ......... *F28D 9/0031* (2013.01); *F28D 9/0037* (2013.01); *F28F 3/048* (2013.01); *F28F 9/026* (2013.01); *F02C 3/04* (2013.01); *F05D 2210/13* (2013.01); *F05D 2220/62* (2013.01); *F05D 2220/72* (2013.01); *F05D 2230/11* (2013.01); *F05D 2260/204* (2013.01); *F05D 2260/205* (2013.01); *F05D 2260/207* (2013.01); *F28D 2021/0026* (2013.01); *F28F 2260/00* (2013.01); *F28F 2275/00* (2013.01); *F28F 2275/061* (2013.01)

(58) Field of Classification Search
CPC .... F02C 7/14; F02C 7/141; F02C 7/16; F02C 7/185; F28F 9/026; F28F 3/048; F28F 2260/02; F28F 2250/06; F28F 2275/061; F28F 3/044; F28D 9/0037; F28D 2021/0026; F28D 2021/0028; F28D 2021/0029; F28D 9/0012; F28D 9/0018; F28D 9/0031; F28D 7/0025; F02K 3/115; F05D 2260/204; F05D 2230/11; F05D 2220/3219; H01L 23/40; H01L 23/46; H01L 23/467; F05B 2240/122; F05B 2240/127; F05B 2260/222; F05B 2260/2212

See application file for complete search history.

(56) References Cited

U.S. PATENT DOCUMENTS

| | | | | |
|---|---|---|---|---|
| 3,866,674 | A * | 2/1975 | Tramuta | F28D 9/0031 165/145 |
| 4,377,025 | A * | 3/1983 | Masai | B23P 15/26 248/324 |
| 4,408,833 | A * | 10/1983 | Gowan | F28D 9/0031 264/1.21 |
| 4,527,622 | A * | 7/1985 | Weber | F28D 9/0018 165/166 |
| 4,729,428 | A * | 3/1988 | Yasutake | F28D 9/0062 165/153 |
| 5,931,638 | A * | 8/1999 | Krause | F01D 5/186 415/115 |
| 6,988,367 | B2 * | 1/2006 | Thompson, Jr. | F01D 5/085 60/744 |
| 6,988,535 | B2 | 1/2006 | Upadhya et al. | |
| 7,156,159 | B2 * | 1/2007 | Lovette | F28F 3/12 165/104.33 |
| 7,360,309 | B2 | 4/2008 | Vaidyanathan et al. | |
| 7,775,031 | B2 * | 8/2010 | Wood | F02C 7/10 165/4 |
| 8,028,410 | B2 * | 10/2011 | Thompson | F28D 9/0043 165/167 |
| 8,109,324 | B2 | 2/2012 | Farid et al. | |
| 8,252,245 | B2 | 8/2012 | Tonkovich et al. | |
| 8,357,310 | B2 | 1/2013 | Steele et al. | |
| 9,279,340 | B2 * | 3/2016 | Muthuramalingam | F02C 7/18 |
| 9,310,079 | B2 * | 4/2016 | Uskert | F23M 5/02 |
| 2004/0055740 | A1 * | 3/2004 | Meshenky | F02B 29/0462 165/125 |
| 2005/0081552 | A1 * | 4/2005 | Nilson | F28D 15/043 62/311 |
| 2007/0298486 | A1 * | 12/2007 | Arora | B01J 19/0093 435/287.1 |
| 2008/0264094 | A1 * | 10/2008 | Campagna | F01K 7/16 62/402 |
| 2009/0120619 | A1 | 5/2009 | Sievert et al. | |
| 2009/0194268 | A1 * | 8/2009 | Kristensen | B29C 65/02 165/185 |
| 2009/0211743 | A1 * | 8/2009 | Schrader | F28D 1/0426 165/173 |
| 2009/0211977 | A1 * | 8/2009 | Miller | B01D 63/082 210/646 |
| 2009/0229794 | A1 * | 9/2009 | Schon | F24J 2/12 165/104.21 |
| 2009/0294113 | A1 * | 12/2009 | Cha | F28D 9/0037 165/185 |
| 2009/0326279 | A1 * | 12/2009 | Tonkovich | B01F 5/0475 568/487 |
| 2010/0044019 | A1 * | 2/2010 | Maeda | F28D 7/0041 165/151 |
| 2010/0139900 | A1 * | 6/2010 | Thompson | F28D 9/0043 165/166 |
| 2010/0326100 | A1 | 12/2010 | Tares et al. | |
| 2011/0073292 | A1 * | 3/2011 | Datta | F28F 1/40 165/157 |
| 2011/0146226 | A1 * | 6/2011 | Wood | F02C 7/10 60/39.511 |
| 2011/0146229 | A1 * | 6/2011 | Bajusz | F28F 9/0075 60/226.1 |
| 2011/0168354 | A1 | 7/2011 | De Jong et al. | |
| 2011/0259017 | A1 * | 10/2011 | Lacy | F01D 5/186 60/806 |
| 2011/0302928 | A1 * | 12/2011 | Mudawar | F02C 7/224 60/782 |
| 2012/0023893 | A1 * | 2/2012 | Yoo | B64D 13/06 60/39.83 |
| 2012/0175095 | A1 * | 7/2012 | Makhlouf | F28D 7/04 165/173 |
| 2012/0177503 | A1 * | 7/2012 | Lee | F01D 5/187 416/96 R |
| 2012/0216543 | A1 * | 8/2012 | Eleftheriou | F02C 7/08 60/772 |
| 2012/0266603 | A1 * | 10/2012 | Uskert | B32B 5/18 60/772 |
| 2012/0291991 | A1 * | 11/2012 | Denkenberger | B21D 53/045 165/81 |
| 2012/0325436 | A1 | 12/2012 | Shedd | |
| 2013/0094944 | A1 * | 4/2013 | Lacy | F01D 5/225 415/173.1 |
| 2013/0152392 | A1 * | 6/2013 | Swinford | B23H 7/02 29/890.03 |
| 2014/0079978 | A1 * | 3/2014 | Al-Hallaj | H01M 10/5048 429/120 |
| 2014/0212628 | A1 * | 7/2014 | Lin | F01D 5/288 428/172 |
| 2014/0246183 | A1 * | 9/2014 | Loebig | F28D 9/0068 165/166 |
| 2015/0047367 | A1 * | 2/2015 | Benignos | F02C 7/143 60/782 |
| 2015/0107801 | A1 * | 4/2015 | Campbell | H05K 7/2039 165/104.33 |
| 2015/0122465 | A1 * | 5/2015 | Mori | F28D 15/00 165/104.33 |
| 2015/0152737 | A1 * | 6/2015 | Liang | F01D 5/187 416/96 R |
| 2015/0184539 | A1 * | 7/2015 | Maier | F04C 29/04 415/177 |
| 2015/0198380 | A1 * | 7/2015 | Haj-Hariri | B64G 1/50 62/3.2 |
| 2015/0204197 | A1 * | 7/2015 | Lee | F01D 5/187 416/97 R |
| 2015/0218962 | A1 * | 8/2015 | Weber | B22C 9/24 415/175 |
| 2015/0240722 | A1 * | 8/2015 | Loebig | F02K 3/115 415/1 |
| 2016/0084167 | A1 * | 3/2016 | Birnkrant | F02C 7/20 60/754 |

(56) References Cited

U.S. PATENT DOCUMENTS

| | | | |
|---|---|---|---|
| 2016/0108740 A1* | 4/2016 | Srinivasan | F01D 5/188 60/806 |
| 2016/0123230 A1* | 5/2016 | Thomas | F28D 1/0358 60/772 |
| 2016/0169016 A1* | 6/2016 | Blaney | F01D 9/065 415/115 |
| 2016/0177751 A1* | 6/2016 | Otomo | F01D 5/02 60/805 |
| 2016/0201914 A1* | 7/2016 | Drake | F02C 7/24 60/782 |
| 2016/0208704 A1* | 7/2016 | Bouldin | F23R 3/002 |
| 2016/0215628 A1* | 7/2016 | Spangler | F01D 5/147 |
| 2017/0067700 A1* | 3/2017 | Sugama | B23K 1/0012 |
| 2017/0114722 A1* | 4/2017 | Turcotte | B01D 35/005 |
| 2017/0131035 A1* | 5/2017 | Honnorat | F02C 7/14 |
| 2017/0314471 A1* | 11/2017 | Sennoun | F01D 9/065 |
| 2017/0350655 A1* | 12/2017 | Pawelzik | F28F 9/0268 |
| 2018/0172368 A1* | 6/2018 | Kowalski | F28F 27/00 |

\* cited by examiner

MICROCHANNEL HEAT EXCHANGERS FOR GAS TURBINE INTERCOOLING AND CONDENSING

CROSS-REFERENCE TO RELATED APPLICATIONS

This application claims priority to U.S. Provisional Patent Application No. 61/943,064 filed Feb. 21, 2014, the contents of which are hereby incorporated in their entirety.

GOVERNMENT RIGHTS

This disclosure was made with government support under FA8650-09-D-2921 0009 awarded by the United States Air Force. The government has certain rights in the disclosure.

FIELD OF TECHNOLOGY

An improved heat exchanger for use in a gas turbine engine is disclosed.

BACKGROUND

Heat exchangers may be employed in the gas turbine engine sector (e.g., the aerospace sector) for the purpose of transferring heat between a core air stream and a bypass stream. Historically, air to air type heat exchangers are employed for this purpose. These types of heat exchangers however can require complex ducting, which adds system weight, costs, and can reduce their effectiveness. Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
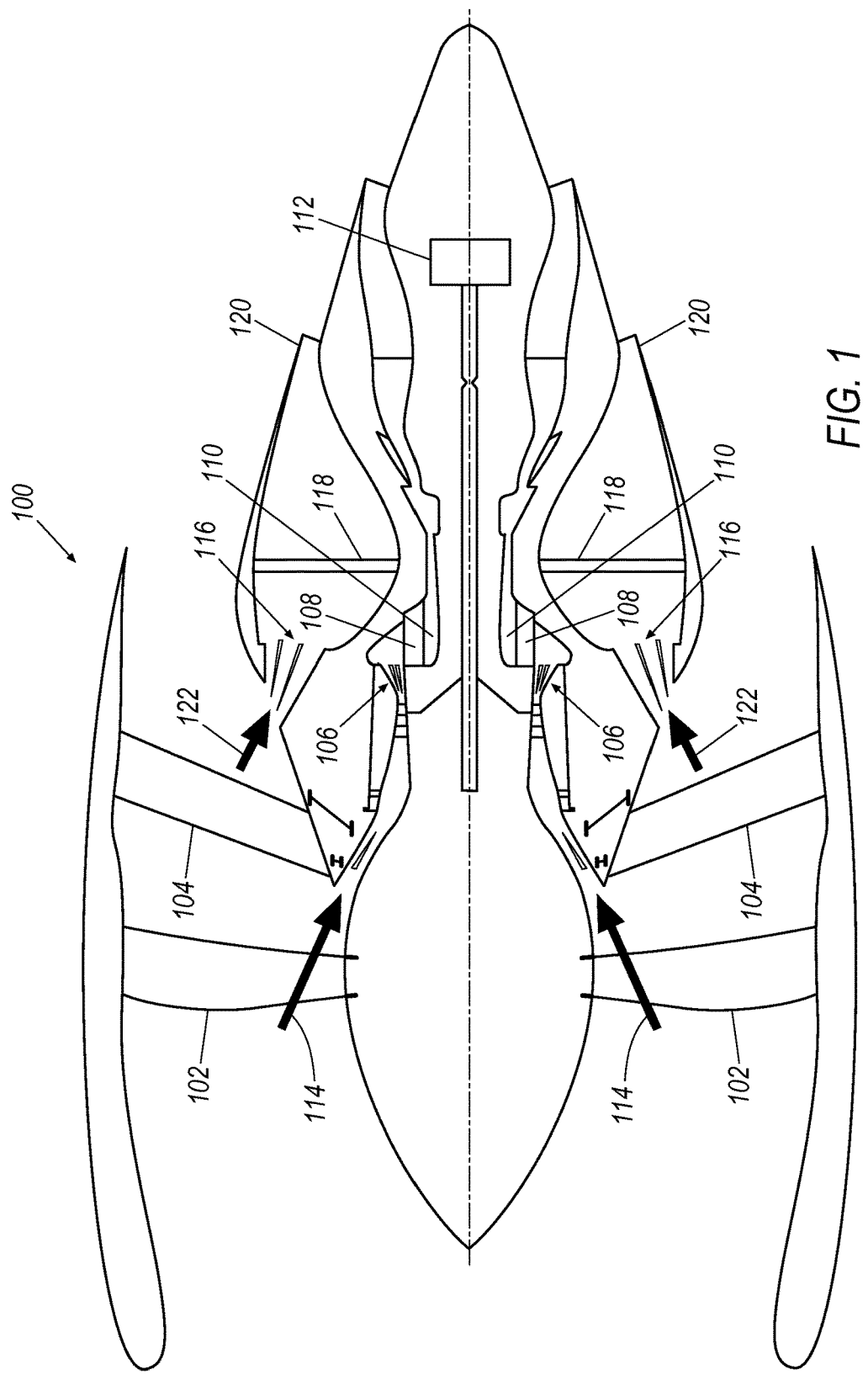
FIG. 1 illustrates an exemplary gas turbine.

FIG. 1 illustrates an exemplary gas turbine engine 100, which includes a fan 102, a vane/strut 104, a core stream diffuser 106, an intercooler-type microchannel heat exchanger (MCHX) 108, a high pressure compressor nozzle 110, and a closed cycle turbine 112. Ambient air enters past the fan 102 and is directed past the core stream diffuser 106 as a core air stream 114 that proceeds through the intercooler-type MCHX 108 where it is cooled.

The gas turbine engine 100 also includes a bypass stream diffuser 116, a condenser-type MCHX 118, and an exit nozzle 120. Fan stream air in the form of a bypass air stream 122 proceeds past the bypass stream diffuser 116 to the condenser-type MCHX 118, and passes through the condenser-type MCHX 118 where the bypass air stream 122 is heated before exiting the exit nozzle 120. As will be discussed in detail below with respect to FIG. 2, according to an embodiment, a working fluid (not shown) that passes through the intercooler-type MCHX 108 of FIG. 1 also passes through the condenser-type MCHX 118. Accordingly, the core air stream 114 heats the working fluid in the intercooler-type MCHX 108 (i.e., heat is transferred from the core air stream 114 to the working fluid in the intercooler-type MCHX 108) while the bypass air stream 122 cools the working fluid in the condenser-type MCHX 118 (i.e., heat is transferred from the working fluid in the condenser-type MCHX 118 to the bypass air stream 122).

Further details regarding the intercooler-type MCHX 108 and the condenser-type MCHX 118 will be set forth below with respect to FIGS. 2-7.

Figure 2:
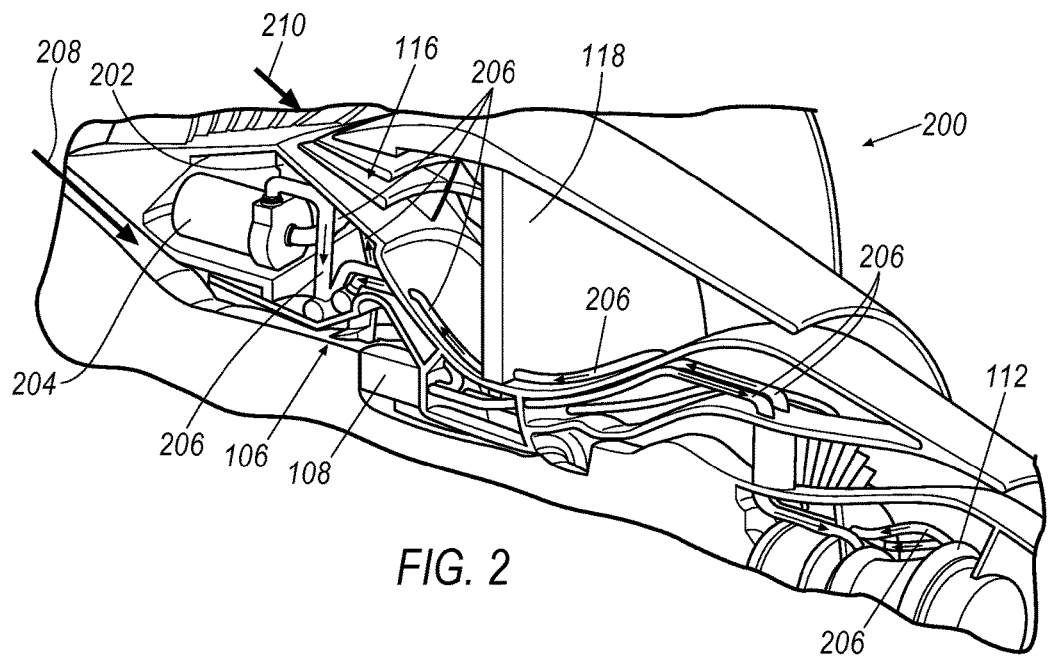
FIG. 2 illustrates a exemplary microchannel heat exchange system according to an embodiment.

With reference now to FIG. 2, a detailed view 200 of a portion of gas turbine engine 100 of FIG. 1 employing a microchannel heat exchange system is shown according to an embodiment. The portions of the gas turbine engine 100 shown in both FIGS. 1 and 2 include the intercooler-type MCHX 108, the closed cycle turbine 112, the condenser-type MCHX 118, the core stream diffuser 106, and the bypass stream diffuser 116. FIG. 2 also depicts an accumulator/separator 202, a liquid working fluid pump 204, and a series of working fluid piping 206.

According to an embodiment, a core air stream 208 passes through the core stream diffuser 106 and through the intercooler-type MCHX 108. As the core air stream 208 passes though the intercooler-type MCHX 108, a working fluid (not shown) therein changes phase from a liquid to a gas as heat from the core air stream 208 is transferred to the working fluid in the intercooler-type MCHX 108. Alternatively, it is contemplated that the working fluid instead changes from a liquid to a supercritical fluid. Referring back to the present embodiment, after passing through the intercooler-type MCHX 108 the working fluid then passes via the series of working fluid piping 206 as a high pressure gas or supercritical fluid to the closed cycle turbine 112 thus generating power. The working fluid is then conveyed via the series of working fluid piping 206 as a low pressure gas or gas and liquid mixture to the condenser-type MCHX 118. The condenser-type MCHX 118 causes the working fluid therein to change phase once again, this time from a gas to a liquid by transferring heat from the working fluid to a bypass air stream 210 that passes through the condenser-type MCHX 118 via the bypass stream diffuser 116.

Accordingly, heat has been transferred from the core air stream 208 to the bypass air stream 210 via the working fluid.

After the working fluid passes through the condenser-type MCHX 118, the working fluid is then conveyed via the series of working fluid piping 206 as a liquid to the accumulator/separator 202, then to the liquid pump 204, and then again to the intercooler-type MCHX 108. As will be appreciated, piping configurations different than the configuration of the series of working fluid piping 206 shown in FIG. 2 may be employed to couple together two MCHXs such as intercooler-type MCHX 108 and condenser-type MCHX 118.

By employing a heat exchange or management system having the intercooler-type MCHX 108 functionally or fluidly connected to the condenser-type MCHX 118 as shown in FIG. 2, heavy and complex ducting previously required with air-to-air heat exchange systems can be avoided or at least minimized.

Figure 3A:
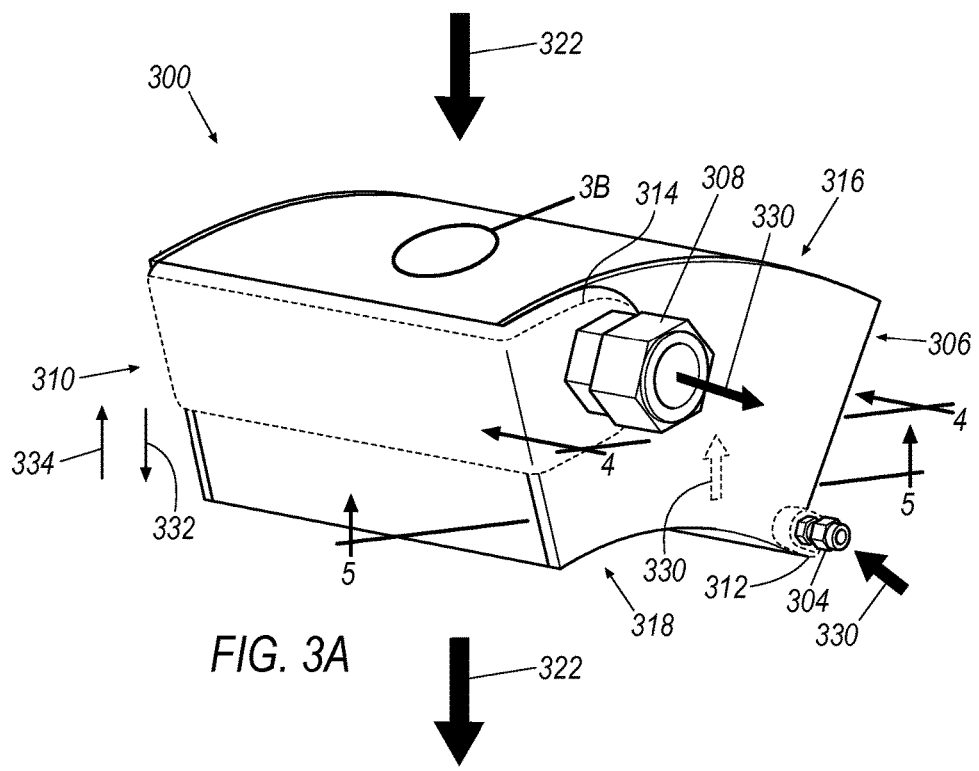
FIG. 3a illustrates an exemplary microchannel heat exchanger (MCHX) according to an embodiment.
Figure 3B:
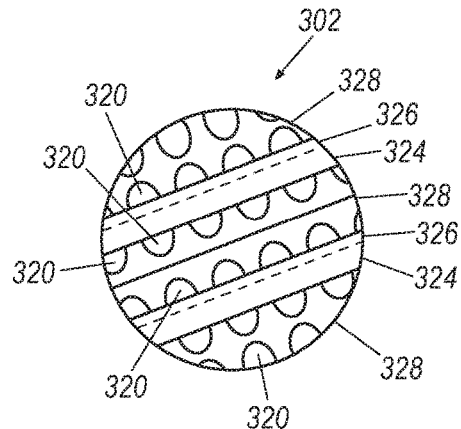
FIG. 3b illustrates an exaggerated view of a region of the exemplary MCHX of FIG. 3a according to an embodiment.

Turning now to FIGS. 3a-3b, an MCHX 300 and an exaggerated view 302 of a portion thereof are shown according to an embodiment. The MCHX 300 includes an inlet 304 on a front side 306 and an outlet 308 also on the front side 306. It is noted, that according to other embodiments, the outlet may be on a back side 310 rather than the front side 306. Alternatively, the outlet 308 may remain on the front side 306, while the inlet 304 is instead positioned on the back side 310. Indeed, according to embodiments, the outlet 308 and inlet 304 may be on any side of the MCHX 300.

Referring to the present embodiment, though not required, it is contemplated that the MCHX 300 have an external intake manifold 312 and an external outtake manifold 314, where each is shown in phantom. The MCHX 300 also includes a top side 316 and a bottom side 318.

The exaggerated view 302 of FIG. 3b is of region A on the top side 316 of the MCHX 300 shown in FIG. 3a. As illustrated in the exaggerated view 302, the top side 316 includes a plurality of air-passage channels 320. These air-passage channels 320 extend through the MCHX 300 from the top side 316 to the bottom side 318. The air-passage channels 320 are configured to allow air 322 to pass through the MCHX 300. That is, the air-passage channels 320 are configured to allow air 322 to enter the top side 316 of the MCHX 300 and exit through the bottom side 318 of the MCHX 300. Further information regarding the plurality of air-passage channels 320 will be set forth in detail below with respect to FIGS. 4 and 7a-b.

The exaggerated view 302 of FIG. 3b also illustrates that the MCHX 300 is comprised of a plurality of layers. The layers include a plurality of working fluid layers 324, a plurality of sealing layers 326, and a plurality of air-passage layers 328 that includes the plurality of air-passage channels 320. Each layer 324-328 extends from the top side 316 of the MCHX 300 to the bottom side 318 of the MCHX 300. It is contemplated that these layers 324-328 include nickel, titanium, and/or aluminum alloys.

According to an embodiment, a working fluid 330 enters the MCHX 300 via the inlet 304 into the external intake manifold 312, passes through the working fluid layers 324 that run parallel with the air-passage channels 320 of the air-passage layers 328, through the external outtake manifold 314, and then out the outlet 308. The working fluid 330 may be almost any fluid or mixture, including high pressure gases, single component 2-phase fluids, multi-component mixtures 2-phase fluids, single component and multi-component supercritical fluids, and single and multi-component liquids.

The MCHX 300 is generally a counter flow-type heat exchanger. That is, as air 322, such as a core stream or a bypass stream, moves through the MCHX 300 via the air-passage channels 320 in a first direction 332, heat is transferred between the air 322 and the working fluid 330 that is moving in a second direction 334 that is opposite the first direction 332. Accordingly, an efficient heat transfer occurs between the air 322 in the air-passage channels 320 and the working fluid 330 moving in an opposite direction in the working fluid layer 324.

If the MCHX 300 functions as an intercooler, the air 322 entering the top side 316 of the MCHX 300 is warmer than the working fluid 330 entering the inlet 304. As such, heat is transferred from the air 322 to the working fluid 330 as each travel in opposite directions through the MCHX 300.

The MCHX 300, if configured to act as an intercooler, is configured to allow the working fluid 330 to take on a gaseous form as it passes through the working fluid layer 324 and absorbs heat from the air 322 passing in the opposite direction through the air-passage layers 328. Accordingly, the working fluid 330 entering the inlet 304 is in a high pressure liquid form and the working fluid leaving the MCHX 300 via the outlet 308 is in a gaseous form (e.g., steam form). It is noted that whether the working fluid 330 is in a fluid or gaseous form, it is still considered a working fluid.

Alternatively, the MCHX 300 may be configured to serve as a condenser-type MCHX. According to such an embodiment, the working fluid 330 passes heat to the air 322 and the working fluid 330 condenses as it passes through the working fluid layer 324.

It is noted that the saddle shape of the MCHX 300 depicted in FIG. 3 may be beneficial in a variety of applications. For example, MCHX 300 may be an intercooler-type heat exchanger that may be fit between an intermediate pressure compressor and a high pressure compressor in a three spool high bypass turban engine. It is noted, however, that embodiments are not dictated by the shape of the MCHX 300 shown in FIG. 3. That is, alternate embodiments may employ other shapes that also employ microchannel air-passage and working fluid layers. Further, embodiments may also be implemented in applications other than three spool applications, such as single or double spool (shaft) applications.

Figure 4:
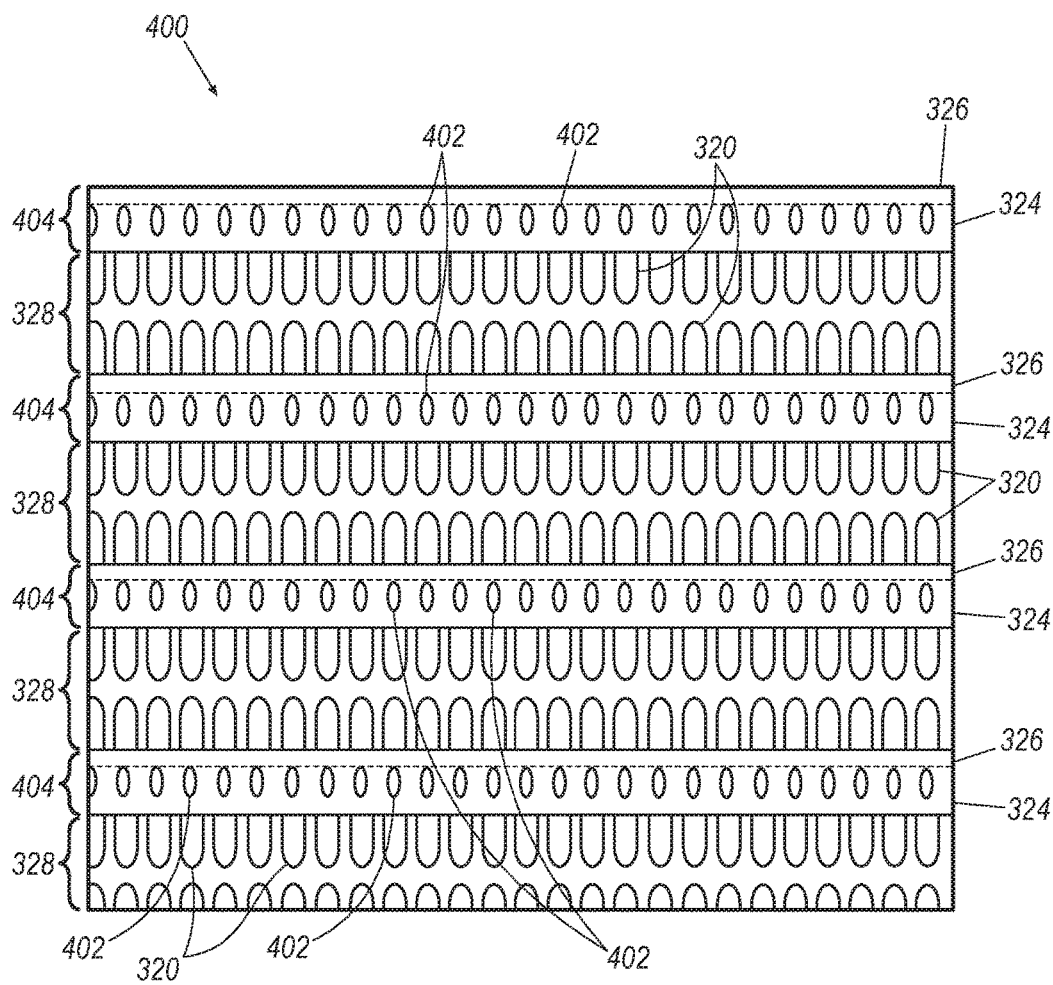
FIG. 4 illustrates a partial cross-sectional view of FIG. 3a along 4-4 according to an embodiment.

Referring now to FIG. 4, a partial cross-sectional view 400 of the MCHX 300 of FIG. 2 along 4-4 is shown according to an embodiment. That is only a portion of the cross-section along 4-4 is shown. As seen in FIG. 4, the plurality of the working fluid layers 324, the plurality of the sealing layers 326, and the plurality of the air-passage layers 328, each depicted in FIG. 3, are also depicted in FIG. 4. Each of the working fluid layers 324 includes a plurality of working fluid channels 402 and each of the air-passage layers 328 includes the plurality of the air-passage channels 320. As air (not shown) passes through the air-passage channels 320, heat is transferred between the air and the working fluid (not shown) that is passing in the opposite direction through the working fluid channels 402. The working fluid channels 402 and air-passage channels 320 are microchannels and the sizes generally range from 0.005 inches to 0.120 inches.

It is contemplated that during manufacturing, the layers 324-328 be bonded together by diffusion bonding or brazing. Accordingly, boundaries between the layers would be generally indistinguishable.

Further, it is contemplated that during manufacturing, a plurality of working/sealing sets 404 are created via diffusion bonding or brazing. That is, each of the working fluid layers 324 is respectively diffusion bonded or brazed to each of sealing layers 326 to form the plurality of working/sealing sets 404. According to an embodiment, the sealing layers 402 are un-etched, and each effectively creates a seal over the working fluid layer 324 while leaving the working fluid channels 402 of the sets 404 open for fluid flow.

These working/sealing sets 404 have a high structural integrity since they, in some aspects, act as a pressure vessel for the high pressure working fluid that flows therethrough. Since the working fluid channels 402 are microchannels, each of the working/sealing sets 404 accommodate a high pressure of working fluid without a corresponding high stress in each of the working/sealing sets 404 due to the low value of Pr/t stress, where "P" is internal pressure, "r" is channel diameter, and "t" is channel wall thickness.

After the sets 404 are created, each is respectively diffusion bonded or brazed to each of the air-passage layers 328. In other words, each of the air-passage layers 328 is sandwiched between two of the working/sealing sets 404.

According to an embodiment where the MCHX, such as MCHX 300, is configured as an intercooler in a turbofan environment, eight of the MCHXs 300 may be employed, each having one hundred and thirty-two air-passage layers 328 with each air-passage channel 320 thereof having a dimension of 0.0225 inches by 0.0225 inches. Each of the eight MCHX 300 would also employ one hundred and thirty-three working/sealing sets 404 with the sets 404 being approximately 0.020 inches thick. In such an embodiment, each of the working/sealing sets 404 may have an approximately 0.005 inch thick un-etched sealing layer 326 and an approximately 0.015 inch thick working fluid layer 324. The etch depth of the working fluid channels 402 may be approximately 0.010 inches. It is noted that according to other embodiments, other dimensions may instead be employed that fall within the microchannel range set forth above.

Figure 5:
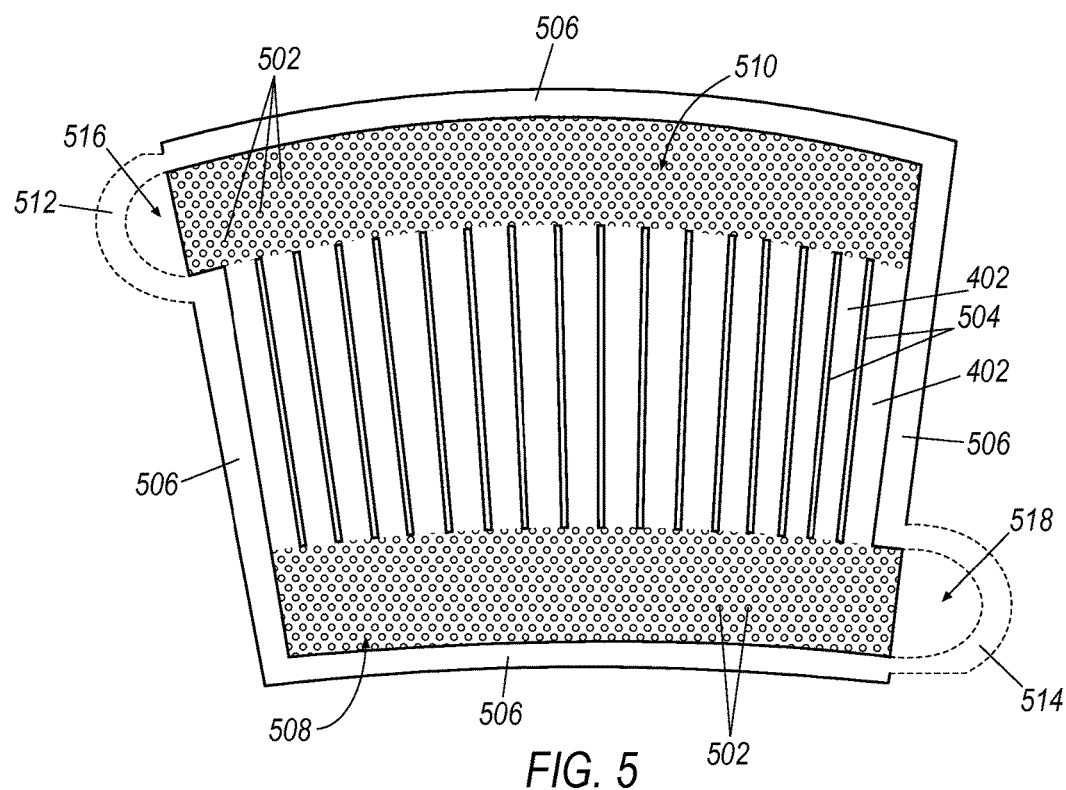
FIG. 5 illustrates a cross-sectional view of FIG. 3a along 5-5 according to an embodiment.

With reference now to FIG. 5, a cross-sectional view of the MCHX 300 of FIG. 3a along 5-5 is shown according to an embodiment. The cross-sectional view shown in FIG. 5 depicts a single working fluid layer 500, such as one of the working fluid layers 324 of FIGS. 3a-4. The single working fluid layer 500 of FIG. 5 includes the plurality of working fluid channels 402, a plurality of raised pedestals 502, a plurality of substrate rises 504, a substrate perimeter 506, and an internal intake and outtake manifolds 508, 510, respectively, around the raised pedestals 502. The internal intake and outtake manifold 508, 510 are generally the same depth as the working fluid channels 402. An upper and lower portion 512, 514 (respectively shown in phantom) of the respective external outtake and intake manifolds 314, 312 of FIG. 3 are also shown. With continued reference to FIG. 5, it is noted that the substrate rises 504, substrate perimeter 506, and the upper and lower portions 512, 514, respectively, are generally at the same height.

FIG. 5 also depicts an external outtake manifold void 516 and an external intake manifold void 518. It is noted that according to an embodiment, external intake and outtake manifolds are not required since the internal intake manifold 508 and the internal outtake manifold 510 may be all that is needed to accommodate the transfer of the working fluid.

According to the present embodiment, the single working fluid layer 500 is configured to allow a working fluid to enter from the external intake manifold void 518 into the internal intake manifold 508 around the pedestals 502 therein and pass into the plurality of working fluid channels 402. It is contemplated that the working fluid be a mixture such as a water-ammonia mixture. The working fluid passes through the working fluid channels 402 and enters the internal outtake manifold 510 where it passes around the raised pedestals 502 therein and out the external outtake manifold void 516. It is noted that, according to the embodiment depicted in FIG. 5, the single working fluid layer 500 is for an evaporative or boiling type MCHX such as intercooler-type MCHX 108 depicted in FIGS. 1 and 2. Accordingly, the volume of the internal outtake manifold 510 of FIG. 5 is larger than the volume of the internal intake manifold 508. The larger volume of the internal outtake manifold 510 accommodates the expansion of the working fluid from a liquid to a gas or supercritical fluid as it passes through the working fluid channels 402. However, in an alternate embodiment not shown where the MCHX is a condenser-type MCHX, the internal outtake manifold has a smaller volume than the internal intake manifold to accommodate the decrease in volume (e.g., condensing from a gas to a liquid) of the working fluid as it passes through the working fluid channels thereof.

With continued reference to FIG. 5, the arrangement of the raised pedestals 502 shown is configured to aid the flow of the working fluid. For example, the arrangement of the raised pedestals 502 in the internal intake manifold 508 aides in the distribution of the working fluid into the working fluid channels 402. Likewise, the arrangement of the pedestals 502 in the upper working fluid region 510 aides in the transfer of the working fluid out of the working fluid channels 402 and into the external outtake manifold void 516.

The size of the working fluid channels 402 generally ranges from 0.005 inches to 0.120 inches. The single working fluid layer 500 is manufactured by a process that combines portions of printed circuit board manufacturing (e.g., masking, ultraviolet exposure, and mask development) with electrochemical machining/etching in sheet metal. With regards to the etching, isotropic or anisotropic etching may be employed.

Due to the manner of manufacturing of the single working fluid layer 500, the design of the single working fluid layer 500 is easily configurable. For example, whereas the embodiment of FIG. 5 depicts straight working fluid channels 402 and round raised pedestals 502, other embodiments may employ different shapes of these features. For example, though not shown, the design artwork may be relatively easily modified to employ pedestals that are not round and/or channels that are staggered or even snake shaped. It is the use of the resist, mask, expose, develop, and electrochemical etching/machining processes employed in the printed circuit board sector that make the design art work easily configurable.

It is noted that embodiments are not dictated by the saddle shape shown in FIG. 5. That is, working fluid layers may take on shapes other than a saddle shape.

Figure 6:
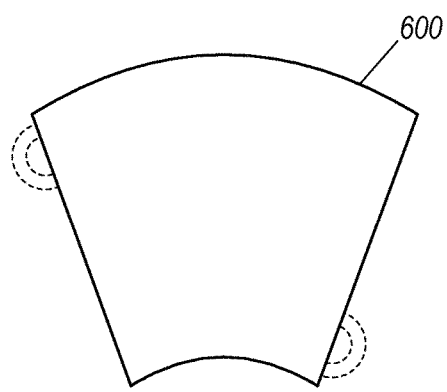
FIG. 6 illustrates an exemplary MCHX sealing layer according to an embodiment.

Referring now to FIG. 6, a sealing layer 600 is shown according to an embodiment. As discussed above with respect to FIG. 4, it is contemplated that each working fluid layer (e.g., single working fluid layer 500 of FIG. 5) is bonded to a sealing layer (e.g., the sealing layer 326 of FIG. 4), thus creating a working sealing set such as working/sealing set 404 of FIG. 4. Accordingly, the sealing layer 600 of FIG. 6 is configured to have generally the same footprint as the working fluid layer (e.g., the working fluid layer 500 of FIG. 5). The sealing layer 600 is bonded via diffusion bonding or brazing to the raised substrate of the working fluid layer. For example, with reference to FIGS. 5 and 6, the sealing layer 600 is bonded to the substrate rises 504, the substrate perimeter 506, the raised pedestals 502, and the upper and lower portions of the respective external outtake and intake manifolds 512, 514 of the single working fluid layer 500. Since neither the working fluid channels 402 nor the internal outtake and intake manifolds 510, 508, respectively, around the raised pedestals 502 are bonded to the sealing layer 600, the working fluid is allowed to move into the internal intake manifold 508 via the external intake manifold void 518, then into the working fluid channels 402, out into the internal outtake manifold 510, and then out through the external outtake manifold void 516.

It is noted that embodiments are not dictated by the saddle shape shown in FIG. 6. That is, sealing layers may take on shapes other than a saddle shape.

Figure 7A:
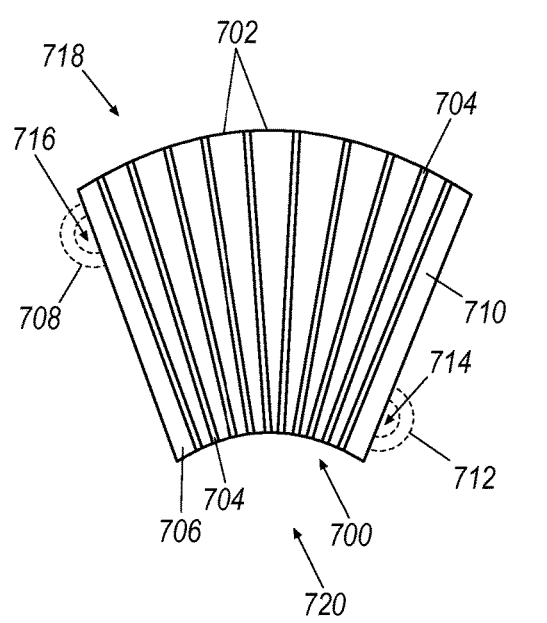
FIG. 7a illustrates an exemplary MCHX air-passage layer according to an embodiment.

With reference now to FIG. 7a, an air-passage layer 700 is shown according to an embodiment. The air-passage layer 700 includes a plurality of air-passage channels 702, a plurality of air-passage substrate rises 704, a first substrate perimeter 706, a portion of external outtake manifold region 708 (shown in phantom), a second substrate perimeter 710, and a portion of an external intake manifold region 712 (shown in phantom). Further, FIG. 7a also depicts a portion of an external intake manifold void 714 and an external outtake manifold void 716.

It is noted that the air-passage channels 702 and the air-passage substrate rises 704 extend from a top end 718 of the air-passage layer 700 to a bottom end 720 of the air-passage layer 700. Further, according to the present embodiment, the air-passage channels 702 generally converge at the bottom end 720 relative to the top end 718. As such, if the air-passage layer 700 is employed in an intercooler-type MCHX (e.g., intercooler-type MCHX 108 of FIGS. 1 and 2), the convergence compensates for any loss of air stream velocity through the air-passage channels 702 of FIG. 7a due to cooling. Other embodiments, however, are envisioned having convergence instead on the top end 718 or no convergence at all.

The air-passage substrate rises 704, first and second perimeters 706, 710, and the portions of the external outtake and intake manifolds 708, 712 are generally at the same height. Accordingly, these areas 704-712 are diffusion bonded or brazed to respective working/sealing sets 404 of FIG. 4 during manufacture.

The air-passage channels 702 of FIG. 7a are microchannels and generally range in size between 0.005 inches and 0.120 inches. The small features of the of the air-passage channels 702 enable a large air surface area of the air-passage layer 700 so that the product of the heat transfer coefficient times the surface area (i.e., the HA product) can be generally the same magnitude as the working fluid layer (e.g., working/sealing sets 404). Accordingly, an MCHX (e.g., intercooler-type MCHX 108 and condenser-type MCHX 118, each of FIGS. 1 and 2, and MCHX 300 of FIG. 3) can be a fraction of the volume of a conventional heat exchanger (not shown) with generally equivalent performance (e.g., air pressure loss and thermal efficiency).

The air-passage layer 700 is manufactured by a process that combines portions of printed circuit board manufacturing (e.g., masking, ultraviolet exposure, and mask development) with electrochemical machining/etching in sheet metal. With regards to the etching, isotropic or anisotropic etching may be employed.

Due to the manner of manufacturing the air-passage layer 700, the design of thereof is configurable. For example, whereas the embodiment of FIG. 7a depicts straight air-passage channels 702, other embodiment may employ different shapes of this feature. For example, though not shown, the design artwork may be relatively easily modified to create staggered or snake shaped air-passage microchannels. Further, it is noted that embodiments are not dictated by the saddle shape shown in FIG. 7a. That is, air-passage layers may take shapes other than a saddle shape.

Figure 7B:
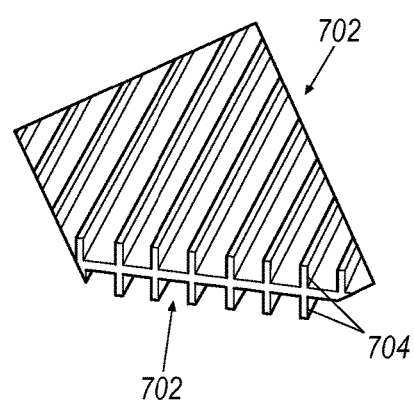
FIG. 7b illustrates a perspective view of a portion of the exemplary MCHX air-passage layer of FIG. 7a according to an embodiment.

Referring now to FIGS. 7b and 7a, where FIG. 7b depicts a perspective view of a portion of air-passage layer 700 according to an embodiment. FIG. 7b illustrates that it is contemplated that the air-passage channels 702 and the air-passage substrate rises 704 are on both sides of air-passage layer 700.

According to embodiments, MCHXs such as MCHX 108 and 118, both of FIGS. 1 and 2, and MCHX 300 of FIG. 3 are comprised of a plurality of microchannel layers (e.g., working fluid layer 324 shown in FIGS. 4 and 5 and air-passage layer 700 shown in FIG. 7). Such MCHXs have a high level or porosity, where porosity is a total void volume (i.e., the sum of each manifold volume and each passage or channel volume) over the total MCHX volume. Whereas a typical heat exchanger (not shown) may have a porosity in the range from twenty to thirty percent, embodiments of the MCHX discussed in detail herein may have a porosity in the range of thirty to seventy percent.

The MCHXs (i.e., 108 and 118 both of FIGS. 1 and 2, and 300 of FIG. 3) and the embodiments thereof discussed in detail above, whether they are of the intercooler or condenser-type MCHXs, have the advantages of having a small size and weight for a given thermal effectiveness and pressure drop. As discussed above, they have a high porosity. Accordingly, these types of MCHXs can be utilized in applications that have tight size and weight requirements. For example, the MCHXs discussed above and the embodiments thereof can be utilized in aerospace application where size and weight requirements need to be met. Further, since an intermediate fluid is utilized (e.g., working fluid 330 of FIG. 3a), the need for heavy and complex ducting often needed for air-to-air type heat exchangers can be avoided.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine heat exchange system comprising a first microchannel heat exchanger (MCHX) configured to transfer heat between a first air stream and a working fluid, wherein the first MCHX comprises:
    a first plurality of air-passage layers respectively including a first plurality of etched air-passage microchannels configured to pass the first air stream therethrough;
    a first plurality of working fluid layers respectively including a first plurality of etched working fluid microchannels configured to pass the working fluid in a through-flow direction, an etched internal intake manifold configured to distribute the working fluid to the first plurality of etched working fluid microchannels, an etched internal outtake manifold disposed opposite to the etched internal intake manifold with respect to the through-flow direction and configured to receive the working fluid from the first plurality of etched working fluid microchannels, a substrate perimeter, and a plurality of working fluid substrate rises structured and arranged to guide the working fluid through the first plurality of etched working fluid microchannels, the plurality of working fluid substrate rises having a longitudinal extent arranged axially to the through-flow direction and extend between the etched internal intake manifold and the etched internal outtake manifold, wherein the etched internal intake manifold is defined between a first longitudinal end of the plurality of working fluid substrate rises and the substrate perimeter, and the etched internal outtake manifold is defined between a second longitudinal end of the plurality of working fluid substrate rises and the substrate perimeter; and wherein the first plurality of working fluid layers respectively further include an arrangement of raised pedestals disposed in the etched internal intake manifold and the etched internal outtake manifold, and wherein the arrangement of raised pedestals includes raised pedestals that extend transversely to the through-flow direction from a respective one of the first plurality of working fluid layers to an adjacent layer and contact the adjacent layer.

2. The gas turbine engine heat exchange system of claim 1, wherein the plurality of air-passage layers respectively have a first end and a second end opposite the first end with respect to an air-flow direction of the first air stream, and wherein the first plurality of etched air-passage microchannels are disposed on a first side of each air-passage layer of the first plurality of air-passage layers and on a second side of each air-passage layer of the first plurality of air-passage layers, and wherein the first side is opposite to and faces away from the second side.

3. The gas turbine engine heat exchange system of claim 1, wherein an inner dimension of each etched air-passage microchannel of the first plurality of etched air-passage microchannels and each etched working fluid microchannel of the first plurality of etched working fluid microchannels is no less than 0.005 inches and no more than 0.120 inches.

4. The gas turbine engine heat exchange system of claim 1, wherein the internal intake manifold has a dimensional volume different than the internal outtake manifold.

5. The gas turbine engine heat exchange system of claim 1, wherein the adjacent layer is a sealing layer bonded to each of the first plurality of working fluid layers via the raised pedestals and the plurality of working fluid substrate rises, and wherein the raised pedestals are bonded to a side of the sealing layer facing towards the etched internal intake manifold and the etched internal outtake manifold of each of the first plurality of working fluid layers.

6. The gas turbine engine heat exchange system of claim 1, wherein the raised pedestals are electrochemically etched into the first plurality of working fluid layers.

7. The gas turbine engine heat exchange system of claim 1, further comprising a second MCHX functionally connected with the first MCHX, wherein the second MCHX comprises:
a second plurality of air-passage layers, wherein each air-passage layer of the second plurality of etched air-passage layers includes a second plurality of etched air-passage microchannels configured to allow the passage of a bypass air stream therethrough; and
a second plurality of working fluid layers, wherein each working fluid layer of the second plurality of working fluid layers includes a second plurality of etched working fluid microchannels configured to allow the passage of the working fluid therethrough, and wherein the gas turbine engine heat exchange system is configured to transport a quantity of heat from the first air stream to the bypass air stream.

8. The gas turbine engine heat exchange system of claim 7, wherein the first MCHX is an intercooler MCHX and the second MCHX is a condenser MCHX.

9. The gas turbine engine heat exchange system of claim 1, the first MCHX further comprising a first plurality of sealing layers bonded to the first plurality of working fluid layers such that a single sealing layer of the first plurality of sealing layers is bonded to a single working fluid layer of the first plurality of working fluid layers to provide a first plurality of working and sealing layer sets, wherein the single sealing layer of the first plurality of sealing layers is bonded to the plurality of working fluid substrate rises, the substrate perimeter, and the arrangement of raised pedestals of the single working fluid layer of the first plurality of working fluid layers, and wherein the single sealing layer is the adjacent layer that the raised pedestals project towards and contact.

10. The gas turbine engine heat exchange system of claim 9, wherein each air-passage layer of the first plurality of air-passage layers is diffusion bonded between two working and sealing layer sets of the first plurality of working and sealing layer sets.

11. The gas turbine engine heat exchange system of claim 10, wherein each air-passage layer of the first plurality of air-passage layers has a first side facing towards a first one of the two working and sealing layer sets and a second side facing towards a second one of the two working and sealing layer sets, the first side and the second side each provided with the first plurality of etched air-passage microchannels, the second side disposed opposite to and facing away from the first side, wherein the first plurality of etched air-passage microchannels are defined by a plurality of air-passage substrate rises structured and arranged to guide the first air stream therethrough, and wherein the plurality of air-passage substrate rises defined on the first side of each air-passage layer is diffusion bonded to the first one of the two working and sealing layer sets and the plurality of air-passage substrate rises defined on the second side of each air-passage layer is diffusion bonded to the second one of the two working and sealing layer sets.

12. A microchannel heat exchanger (MCHX) system configured to transport heat within a gas turbine engine, the MCHX system comprising:
a first MCHX having an air inlet face and an air outlet face, comprising:
a plurality of first layers respectively including a plurality of electrochemically etched air-passage microchannels configured to convey a first air stream through the first MCHX in a first direction, and a plurality of air-passage substrate rises structured and arranged to guide the first air stream through the plurality of electrochemically etched air-passage microchannels from a first end of the plurality of first layers to a second end of the plurality of first layers, the second end disposed opposite the first end with respect to the first direction;
a plurality of second layers respectively including a plurality of electrochemically etched working fluid microchannels configured to convey a working fluid through the first MCHX in a second direction opposite the first direction, an electrochemically etched internal intake manifold configured to convey the working fluid to the plurality of electrochemically etched working fluid microchannels, an electrochemically etched internal outtake manifold disposed opposite to the electrochemically etched internal intake manifold with respect to the second direction, the electrochemically etched internal outtake manifold configured to receive the working fluid from the plurality of electrochemically etched working fluid microchannels, and an arrangement of raised pedestals disposed in the electrochemically etched internal intake manifold and the electrochemically etched internal outtake manifold;

wherein the plurality of second layers run parallel with the plurality of first layers to provide a counter-flow between the working fluid conveyed through the plurality of electrochemically etched working fluid microchannels in the second direction and the first air stream conveyed through the plurality of electrochemically etched air-passage microchannels in the first direction;

wherein the plurality of air-passage substrate rises have a longitudinal extent arranged axially to the first direction along the plurality of first layers and extend from the first end to the second end to provide air-passage openings for the plurality of electrochemically etched air-passage microchannels at the air inlet face and the air outlet face of the first MCHX such that the first air stream passes through the first MCHX in the first direction from the air inlet face to the air outlet face via the plurality of electrochemically etched air-passage microchannels; and wherein the arrangement of raised pedestals disposed in the electrochemically etched internal intake manifold and the electrochemically etched internal outtake manifold include raised pedestals that extend transversely to the second direction from a respective one of the plurality of second layers to an adjacent layer and contact a side of the adjacent layer facing towards the respective one of the plurality of second layers.

13. The MCHX system of claim 12, wherein the first MCHX has a porosity between 0.30 and 0.70, and wherein the porosity is a sum of each void volume in the first MCHX divided by a total volume of the first MCHX.

14. The MCHX of claim 12, wherein the plurality of electrochemically etched air-passage microchannels extend straight through the plurality of first layers from the first end to the second end to provide a linear flow path of the first air stream in the first direction, and wherein the first end of the plurality of first layers is disposed at the air inlet face of the first MCHX and the second end of the plurality of first layers is disposed at the air outlet face of the first MCHX.

15. The MCHX system of claim 12, wherein the plurality of second layers respectively further include:
a plurality of working fluid substrate rises defining the plurality of electrochemically etched working fluid microchannels, wherein the plurality of electrochemically etched working fluid microchannels extend along the second direction between the electrochemically etched internal intake manifold and the electrochemically etched internal outtake manifold;
a surrounding substrate perimeter including a first portion provided along an outer edge of the electrochemically etched internal intake manifold and a second portion provided along an outer edge of the electrochemically etched internal outtake manifold, wherein the electrochemically etched internal intake manifold is defined between the first portion of the substrate perimeter and a first end of the plurality of working fluid substrate rises, and the electrochemically etched internal outtake manifold is defined between the second portion of the substrate perimeter and a second end of the plurality of working fluid substrate rises; and
wherein the first portion and the second portion of the substrate perimeter are disposed in a region corresponding to the first end and the second end of the plurality of first layers, respectively, such that the substrate perimeter closes the plurality of second layers at the air inlet face and the air outlet face of the first MCHX.

16. The MCHX system of claim 15, wherein the substrate perimeter defines a lateral intake void at the electrochemically etched internal intake manifold and a lateral outtake void at the electrochemically etched internal outtake manifold to provide a cross-flow between the working fluid and the first air stream in a region of the electrochemically etched internal intake manifold and the electrochemically etched internal outtake manifold.

17. A method of conveying a quantity of heat within a gas turbine engine comprising:
passing an air stream from a gas turbine engine through an air-passage layer of a first heat exchanger via a plurality of etched microchannel air passages in a first flow direction, wherein passing the air stream through the air-passage layer includes receiving the air stream at a first end of the air-passage layer arranged along an air inlet face of the first heat exchanger and exiting the air stream at a second end of the air-passage layer arranged along an air outlet face of the first heat exchanger, the second end disposed opposite to the first end with respect to the first flow direction;
passing a working fluid through a working fluid layer of the first heat exchanger via a plurality of etched microchannel working fluid passages in a second flow direction opposite and parallel to the first direction such that a quantity of heat is transferred between the working fluid and the air stream;
wherein passing the working fluid through the working fluid layer includes:
distributing the working fluid into the plurality of etched microchannel working fluid passages via a plurality of raised pedestals disposed in an internal intake manifold upstream of the plurality of etched microchannel working fluid passages with respect to the second flow direction; and
transferring the working fluid out of the plurality of etched microchannel working fluid passages via a plurality of raised pedestals disposed in an internal outtake manifold downstream of the plurality of etched microchannel working fluid passages with respect to the second flow direction; and
wherein the working fluid layer is bonded to a sealing layer via the plurality of raised pedestals disposed in the internal intake manifold and the internal outtake manifold, where the plurality of raised pedestals extend from the working fluid layer to a side of the sealing layer facing towards the internal intake manifold and the internal outtake manifold and contact the side of the sealing layer via a bonded connection.

18. The method of conveying a quantity of heat within the gas turbine engine of claim 17, wherein distributing the working fluid into the plurality of etched microchannel working fluid passages includes introducing the working fluid into the internal intake manifold and guiding the working fluid around the plurality of raised pedestals disposed therein between the working fluid layer and the sealing layer, and transferring the working fluid out of the plurality of etched microchannel working fluid passages includes passing the working fluid into the internal outtake manifold and around the plurality of raised pedestals disposed therein between the working fluid layer and the sealing layer.

19. The method of conveying the quantity of heat within the gas turbine engine of claim 17, wherein passing the air stream through the air-passage layer includes guiding the air stream straight through the plurality of etched microchannel air passages to provide a linear flow path in the first flow direction from the first end to the second end of the air-passage layer.

20. The method of conveying a quantity of heat within the gas turbine engine of claim 19, wherein guiding the air stream straight through the plurality of etched microchannel air passages includes converging the air stream in the first flow direction from the first end to the second end of the air-passage layer.

* * * * *